US011386470B2

United States Patent
Kulkarni et al.

(10) Patent No.: US 11,386,470 B2
(45) Date of Patent: Jul. 12, 2022

(54) PARTNER FEE RECOMMENDATION SERVICE

(71) Applicant: PAYPAL, INC., San Jose, CA (US)

(72) Inventors: Shyamsundar Kulkarni, San Jose, CA (US); Anjana Manian, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 236 days.

(21) Appl. No.: 16/457,258

(22) Filed: Jun. 28, 2019

(65) Prior Publication Data
US 2020/0410556 A1    Dec. 31, 2020

(51) Int. Cl.
*G06Q 30/02* (2012.01)
*G06Q 30/06* (2012.01)

(52) U.S. Cl.
CPC ..... *G06Q 30/0283* (2013.01); *G06Q 30/0619* (2013.01)

(58) Field of Classification Search
CPC ............ G06Q 30/0283; G06Q 30/0619
USPC ............................................. 705/7.35
See application file for complete search history.

(56) References Cited

U.S. PATENT DOCUMENTS

| | | | |
|---|---|---|---|
| 2005/0187818 A1* | 8/2005 | Zito | G06Q 30/0254 705/14.52 |
| 2008/0154761 A1* | 6/2008 | Flake | G06Q 40/04 705/37 |
| 2012/0046998 A1* | 2/2012 | Staib | G06Q 30/0245 705/7.35 |
| 2015/0081462 A1* | 3/2015 | Ozvat | G06Q 20/40 705/21 |
| 2015/0106260 A1* | 4/2015 | Andrews | G06Q 20/4016 705/39 |
| 2017/0091722 A1* | 3/2017 | Miyamoto | G06Q 20/26 |
| 2018/0232786 A1* | 8/2018 | Kuzkin | G06Q 30/04 |
| 2019/0318367 A1* | 10/2019 | Myles | G06Q 30/0201 |

OTHER PUBLICATIONS

"Decision Support and Data Mining for Direct Consumer-to-consumer Trading", Chan et al. 2014 (Year: 2014).*

* cited by examiner

*Primary Examiner* — Charles Guiliano
*Assistant Examiner* — Po Han Lee
(74) *Attorney, Agent, or Firm* — Haynes and Boone, LLP

(57) ABSTRACT

Methods and systems are provided to determine a partner fee recommendation. Such a partner fee may be a flat fee, percentage-based fee, or both, that a marketplace provider charges for sellers to use their platform. The partner fee recommendation may be calculated based on a plurality of factors. The partner fee recommendation may be based on data from a plurality of marketplaces. At least a portion of such data may be collected by a payment service provider or other service provider that provides services at multiple levels of transactions and through a plurality of marketplace platforms.

20 Claims, 9 Drawing Sheets

PARTNER FEE RECOMMENDATION SERVICE

BACKGROUND

Field of the Invention

The present invention generally relates to online merchants and specifically to providing fee recommendation services for online merchants.

Related Art

Various marketplaces adopt various revenue models for charging fees to merchants that utilize their marketplaces. Such models may include a percentage-based fee, a flat fee, or a combination of both from every transaction carried out on the marketplace. Percentage-based fees provide the seller with the benefit of not incurring any costs before the seller obtains value from the marketplace. Such a benefit provides an attractive incentive for sellers to utilize the services of the marketplace. However, many marketplaces adopt variations of such models and compete for the same customer base.

Figure 1:
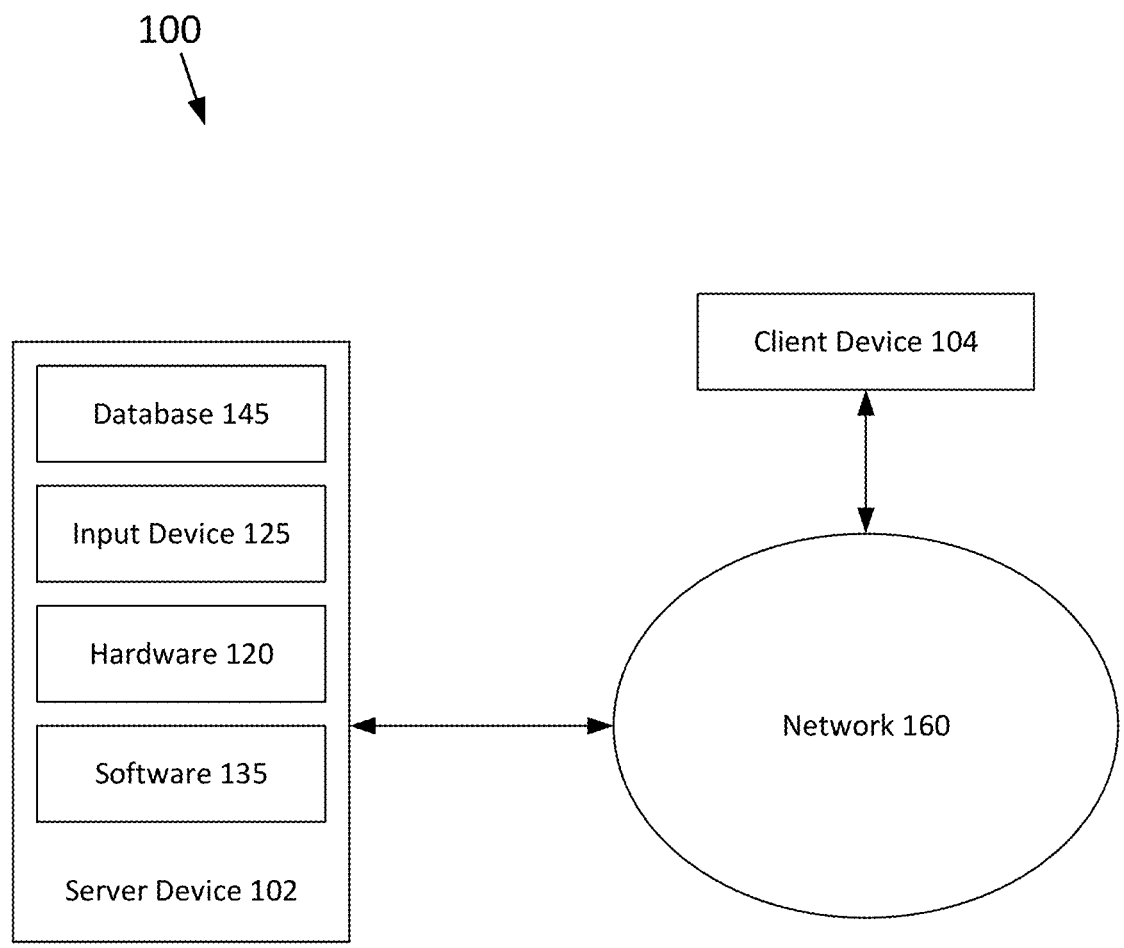
FIG. 1 is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow for determination of a partner fee recommendation. Partner fees may be flat fees, percentage-based fees, or both. A marketplace provider (such as an online marketplace provider that allows for sellers to list on their website) may charge a seller a partner fee to allow the seller to use their platform. The partner fee recommendation may be provided to a marketplace provider, a merchant, or another party associated with the marketplace provider or the merchant.

The partner fee recommendation may be calculated based on a plurality of factors. Such factors can include, for example, partner fee amounts (e.g., per transaction) charged by various online marketplaces and other factors such as onboarding data, sales data, offerings data (e.g., items sold by the merchant), and other related data, as discussed in detail herein. In certain embodiments, the partner fee recommendation may be based on data from a plurality of marketplaces (e.g., charged by competitors of the marketplace provider). Furthermore, partner fee amounts for a plurality of different marketplace platforms may be determined (e.g., when providing recommendations to a merchant) by cross-referencing data from different marketplace platforms.

Such a determination may thus be made based on, for example, data collected by a payment service provider such as PayPal® or another service provider. The service provider may, in certain situations, provide services to a plurality of marketplace platforms. Thus, the service provider may be able to acquire data associated with the plurality of marketplace platforms through the services that they offer. Thus, for example, a payment service provider may provide payment for a plurality of transactions conducted through a plurality of marketplace platforms. From such data, a determination may be made of the partner fee amounts charged by each of the marketplace platforms. Such determined partner fee amounts may then be used to determine the partner fee recommendation.

In certain embodiments, the payment transactions may be for a full amount, while other embodiments may break down the payment transactions into component parts. In certain embodiments, a machine learning network, such as a neural network, may determine the partner fee portion of the payment transaction. The machine learning network may be trained to sort component parts of the payment transaction to determine the partner fee amount.

In various embodiments, the partner fee recommendation may be determined by a machine learning network or deep neural network. The machine learning network may be trained to perform such determinations. The partner fee determinations may be accordingly communicated to the targeted party through one or more communications techniques. Using various embodiments of the disclosure, a more effective partner fee (e.g., type and/or amount) for a specific merchant or marketplace provider may be determined, either initially or at other times, as data changes, especially with the number of online transactions being conducted through networks and online platforms. This enables the merchant and/or the marketplace provider to improve transactions conducted through the marketplace platform, based on what may be important to the marketplace provider or the merchant. Additionally, embodiments of the disclosure allow for improved operations of neural networks and other machine learning devices. For example, classification of payment transactions and other factors is a challenging task for neural networks. Aspects of the disclosure allow for a neural network to be trained to more accurately classify and associate aspects of payment transactions. Improved classification may allow neural networks to improve the usefulness of its partner fee recommendations. Furthermore, the disclosure herein illustrates a technique where curation and classification of payment transaction are separate from the determination of a partner fee recommendation. Separating the aspects may result in more accurate determinations by a neural network of aspects of the payment transactions.

FIG. 1 is a schematic diagram showing a system according to an embodiment of the disclosure. In certain embodiments, the system shown in FIG. 1 may include or implement one or more electronic devices such as mobile devices, desktop computers, servers, and/or software components that operate to perform various transactions or processes. It can be appreciated that the system illustrated in FIG. 1 may be deployed in other ways and that the operations performed and/or the services provided by the electronic devices described herein may be combined or separated for a given implementation and may be performed by a greater number or fewer number of devices.

The system of FIG. 1 may include a server device 102 and a client device 104. The devices of the system may communicate with one or more other devices over a network 160. Server device 102 may be maintained by or associated with a payment provider, a merchant, or another service provider. Server device 102 may be configured to receive data associated with payment transactions, store the data, determine aspects of the payment transactions such as the partner fee amount of the payment transactions, receive other data, and determine a partner fee recommendation. In certain embodiments, server device 102 may be integrated into one or more servers. Such servers may additionally be configured to perform other operations, such as payment or transaction processing. Thus, server device 102 may be maintained by a service provider, such as PayPal®, Inc. of San Jose, Calif. Such servers may also include one or more databases storing data (e.g., historical transactions or device data) related to the determined partner fee recommendations or previously received or classified data. "Transaction," as used herein, refers to any suitable action where an item, content/data, or service is exchanged for consideration, such as payment.

Server device 102 and client device 104 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to the devices and/or accessible over network 160. Network 160 may be implemented as a single network or a combination of multiple networks. For example, in various embodiments, network 160 may include the Internet and/or one or more intranets, landline networks, wireless networks, and/or other appropriate types of networks. Server device 102 and client device 104 may be implemented using any appropriate hardware and software configured for wired and/or wireless communication over network 160.

In certain embodiments, server device 102 may include an input device 125 that may include components (e.g., a touch screen, a mouse, a keyboard, and other input device) configured to receive user inputs, provide outputs to the user, and/or otherwise allow for operation of server device 102.

Software 135 may include applications to perform functions and processes described herein or provide other features for server device 102. For example, software 135 may include security applications for implementing client-side security features, programmatic client applications for interfacing with appropriate application programming interfaces (APIs) over network 160, or other types of applications. Software 135 may also include applications that enable transfer of information, processing of payments, and otherwise allow conducting of transactions through the service provider as described herein.

In certain embodiments, various APIs may allow for operation of software 135, operation of one or more machine learning networks or neural devices, communication with other devices (e.g., client device 104), storage, lookup, and management of data, calculation of values, analysis of payment transactions (e.g., to identify a transaction fee), and/or other operations. Such APIs may be implemented as one application or may be a combination of APIs from multiple applications. As such, APIs may be used to allow for programs that perform the techniques described herein.

Server device 102 may include hardware 120, which may be similar to hardware described herein. Hardware 120 may be configured to allow operation (e.g., by providing processing resources, cooling, and/or other performing other operations) of server device 102.

Server device 102 may also include a database 145 that stores data associated with payment transactions, recommendations, partner fees, and other such data. Such data may include historical data, current data, data from transactions performed by the service provider, data obtained from other sources, and/or other such data. Database 145 may also include data identifying one or more associated parties. Such associated parties may, for example, be a merchant or a platform provider.

Client device 104 may be a device operated by a merchant, a marketplace platform provider, a customer, and/or another party associated with sales or transactions provided through a marketplace platform. Client device 104 may include any number of hardware, software, input devices, and databases as described herein for server device 102, as well as other components.

Figure 2A:
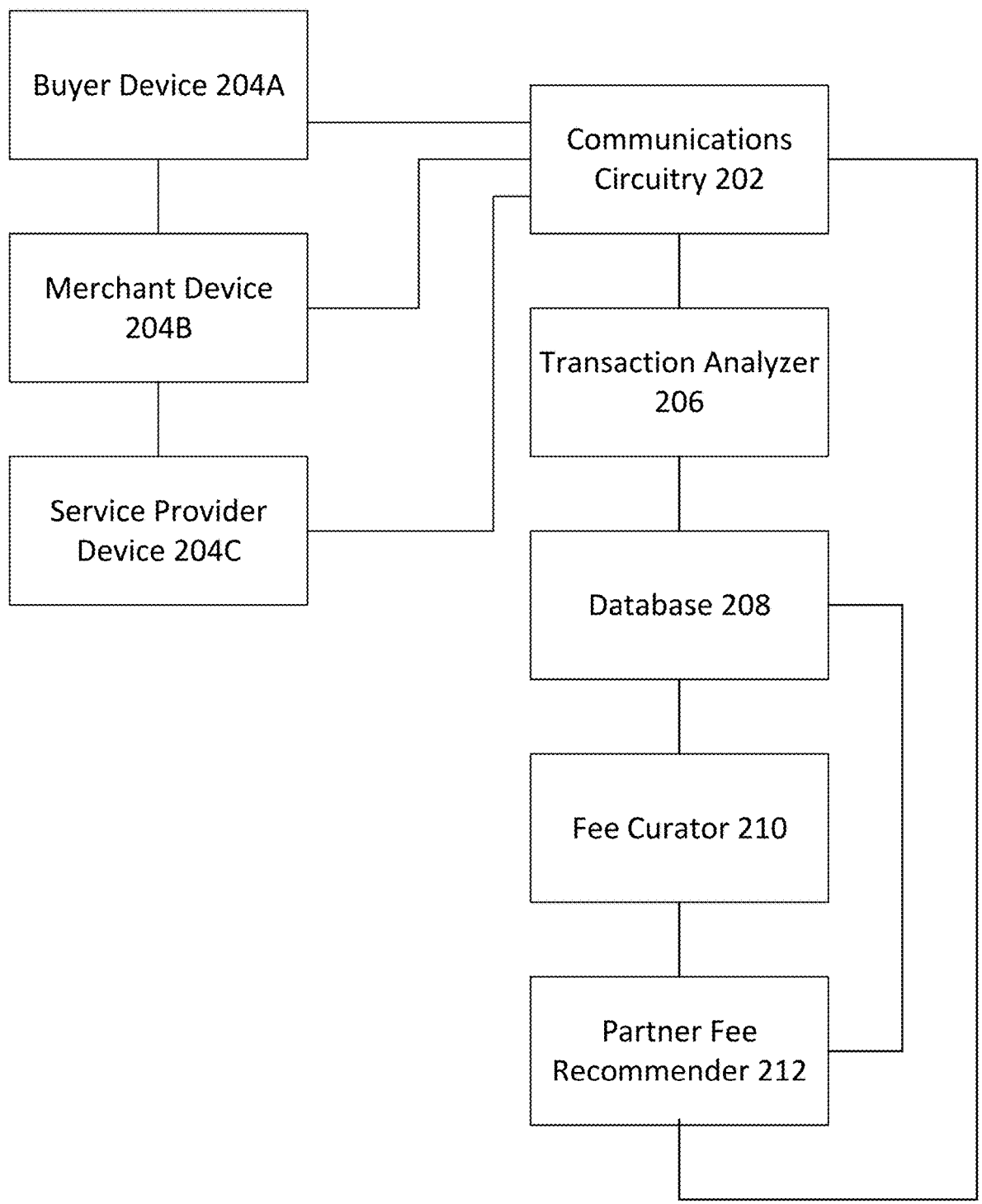
FIG. 2A is a block diagram showing a system for determining a partner fee recommendation according to an embodiment of the disclosure.

In various embodiments, the system of FIG. 1 or portions thereof may be used to provide a partner fee recommendation. FIG. 2A is a block diagram showing a system for determining a partner fee recommendation according to an embodiment of the disclosure. FIG. 2A illustrates a system that includes communications circuitry 202, a transaction analyzer 206, a database 208, a fee curator 210, a partner fee recommender module 212, and a marketplace partner 214. Database 208 may be similar to database 145 of FIG. 1. Communications circuitry 202 may be a portion of hardware 120 of FIG. 1. Transaction analyzer 206, fee curator 210, and partner recommender module 212 may be implemented as software 135 of FIG. 1.

Communications circuitry 202 may receive data from one or more external sources. Such sources may be, for example, one or more marketplace platforms, merchants, or buyers. For example, communications circuitry 202 may receive data from buyer device 204A, merchant device 204B, and/or service provider device 204C. Such data may include payment transaction data, sales data, conducted transaction data, offerings data, and onboarding data. Such data are further described in FIG. 2B. Thus, in addition to communicating with communications circuitry 202, buyer device 204A, merchant device 204B, and/or service provider device 204C may also communicate amongst each other to conduct the transaction. In certain embodiments, communications circuitry 202 may directly communicate with buyer device 204A, merchant device 204B, and/or service provider device 204C. Thus, the partner fee recommender may receive data from each member of a transaction independently (e.g., receive data from all three of buyer device 204A, merchant device 204B, and service provider device 204C who are all involved in a single transaction). Furthermore, by receiving data directly from each of buyer device 204A, merchant device 204B, and service provider device 204C, the partner fee recommender may receive data conducted by the merchant over multiple marketplace platforms (e.g., marketplace platforms in addition to that of service provider device 204C). Thus, the partner fee recommender may receive data conducted by merchants and/or buyers over a plurality of different marketplace platforms.

In various embodiments, data received from communications circuitry 202 may be stored and/or used to determine a partner fee recommendation (e.g., a recommended fee structure for the marketplace partner such as a recommended flat fee or percentage-based fee). Thus, communications circuitry 202 may provide the received data to transaction analyzer 206. Transaction analyzer 206 may first analyze (e.g., break down into component parts such as breaking down a payment transaction into multiple components that factor into the cost of the payment transaction) and/or transform the data and then provide the data to database 208. Database 208 may then store the data for use in curating and determining a partner fee recommendation. In certain other embodiments, data received from communications circuitry 202 may first be stored within a database, or may be stored after processing by various other elements of the system (e.g., after processing by fee curator 210).

Database 208 may provide data to fee curator 210. Such data may include, for example, payment transaction data directed to one or more payment transactions conducted or listed on the marketplace platform. Fee curator 210 may be configured to classify a payment transaction as a purchase transaction (e.g., payment for goods or services), a partner fee transaction (e.g., payment for utilization of the marketplace platform), or another such transaction. Fee curator 210 may, additionally or alternatively, be configured to break down the payment transaction into component parts that include a purchase transaction portion and/or a partner fee transaction portion.

In certain embodiments, fee curator 210 may be a deep neural network (DNN) machine learning (ML) model trained to classify the payment transaction into the relevant parts (e.g., purchase transaction or partner fee transaction). Thus, for example, a payment transaction may include a plurality of different parameters. Such parameters may include, for example, a transaction ID, a buyer identity, a seller identity, a platform partner identity, an amount for payment of the goods or services, a partner fee amount, a partner fee payer (e.g., whether the buyer or seller or a combination of both pays the partner fees), and payment context.

Examples of payment transactions with such parameters include, for example, transactions with a buyer, a seller, a payment provider (e.g., a payment platform such as PayPal®), and a marketplace platform provider. Example transactions can include transactions where: 1) The buyer pays the seller. The seller pays the payment provider fees and the marketplace platform fees. 2) The buyer pays the marketplace platform. The marketplace platform pays the payment provider fees, keeps the marketplace platform portion of the payment, and provides the rest to the seller. 3) The buyer pays the seller. The seller pays the payment provider fees and pays the marketplace platform fees via the payment provider. 4) The buyer pays the marketplace provider and the seller in separate transactions. Either the marketplace provider or the seller provides the payment provider fees. Such examples and other examples may, thus, include one or a plurality of transaction that are split between multiple different parties to the transaction.

In certain embodiments, payment from one or more parties to other various parties may be identified through parameters such as markers or identifying remarks. The data provided to fee curator 210 may include such identifying information. These parameters are then used as inputs for fee curator 210. Fee curator 210 may be trained to classify the payment transaction based on the inputs. According, fee curator 210 may determine, from the payment transactions, whether each payment transaction, or a portion thereof, is a purchase transaction (e.g., for goods or services) or a fee payment and classify each accordingly. Such classifying may be described in further herein in, for example, FIGS. 3-5.

Fee curator 210 may additionally associate each fee payment or partner fee transaction with a corresponding purchase transaction to create full transactions. For example, certain embodiments may output each (e.g., each purchase or fee payment transaction) as separate transactions to fee curator 210. Fee curator 210 may then associate each purchase transaction with the corresponding fee payment transaction to create complete transactions. Once fee curator 210 makes such a determination and association, fee curator 210 may output the sorted transactions to partner fee recommender module 212 as partner fee data.

Partner fee recommender module 212 may receive the partner fee data including the sorted transactions from fee curator 210, as well as additional data. Based on the received data, partner fee recommender module 212 may determine a recommended fee that the marketplace platform should charge one or more merchants or a fee that a merchant should request from a marketplace platform.

In certain embodiments, partner fee recommender module 212 may also be a DNN ML model, or a further DNN ML model (e.g., a DNN ML model operated by a separate electronic device) trained to utilize the various data received (e.g., the partner fee data) to determine a recommended partner fee for a given merchant, transaction, marketplace platform, and/or other aspect of a transaction. In certain embodiments, additional data gathered from the marketplace platform, other marketplace platforms, merchants, sellers, and/or other data sources such as onboarding data, conducted transaction data, sale data, and/or other data may be further used to determine the partner fee recommendation.

Once a recommended partner fee is determined, the recommendation may be stored within database 208 for record keeping purposes and/or for training purposes for ML networks. The recommendation may also be provided to marketplace partner 214. In certain other embodiments, the recommendation may instead be provided to another party such as a merchant.

Figure 2B:
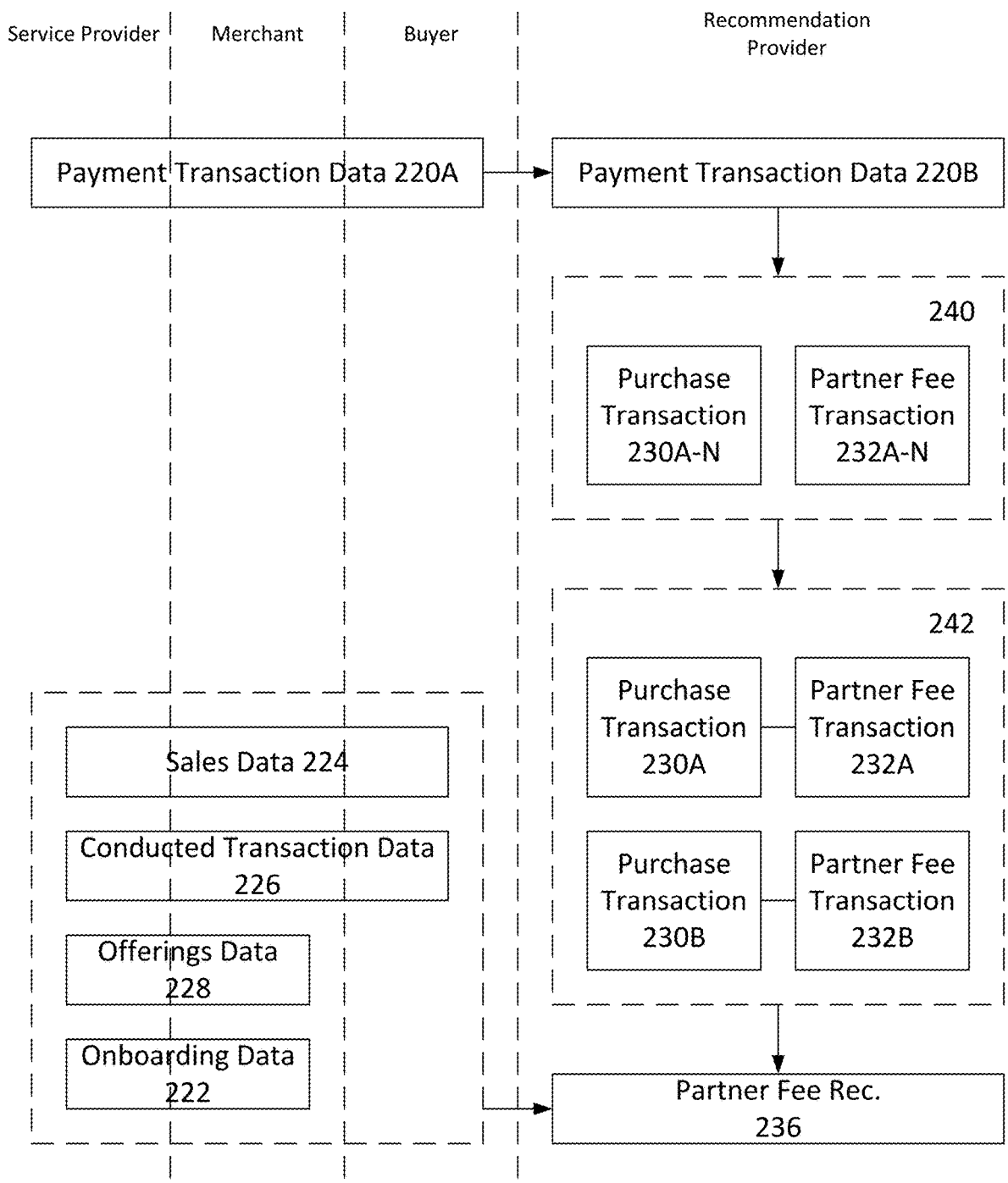
FIG. 2B is a block diagram showing a flow of data within a system for determining a partner fee recommendation according to an embodiment of the disclosure.

The flow of data within the systems of FIGS. 1 and 2A may be further detailed in FIG. 2B. FIG. 2B is a block diagram showing a flow of data within a system for determining a partner fee recommendation according to an embodiment of the disclosure. FIG. 2B illustrates the sources and transformation of data within systems as described herein. Thus, FIG. 2B is divided into columns representing service providers, merchants, buyers, and the recommendation provider. Data is represented as blocks and if such data originates or is manipulated by one or more service providers, merchants, buyers, and the recommendation provider, the blocks are positioned within the columns of the corresponding parties. The service providers described herein may include marketplace platform providers as well as payment service providers. Blocks representing data split over multiple columns (e.g., sales data 224 which is split between the columns for the service provider, merchant, and buyer) may be data that is separately received from each party or aggregated (e.g., by one or more of the parties) and received from one party. Thus, the service provider, merchant, and buyer may each separately and independently provide sales data 224 to the recommendation provider. In such an example, the merchant or buyer may, for example, communicate data for multiple transactions conducted across multiple marketplace platforms to the recommendation provider. Alternatively or additionally, one or more service providers may obtain sales data 224 from all transactions conducted by the merchant and the buyer on their respective marketplace platforms and provide sales data 224 to the recommendation provider.

In certain embodiments, the service provider may be a marketplace platform provider that provides an intermediate platform for a buyer and seller to conduct a transaction. Thus, for example, the marketplace platform provider may provide a listing space, a virtual store, a concierge service, a matchmaking service, and/or another such type of service to allow for a transaction to be conducted between the buyer and the seller. In certain embodiments, marketplace platform provider may charge a fee for providing the platform (e.g., a fixed, percentage based, or other such fee). The marketplace platform provider may utilize the services of a payment service provider such as PayPal® or is interested in doing so (e.g., the marketplace platform provider may be interested in utilizing the services of the payment service provider and the partner fee recommendation may be provided as a recommendation to the marketplace platform provider as a recommended fee to charge when partnering with the payment service provider).

Payment transaction data 220A may be similar to payment transaction data described herein. Payment transaction data 220A may include the amount of transaction, partner fee charged, item and/or services provided, merchant identity, customer identity, marketplace partner identity, discounts, and/or other such information associated with the transaction. Payment transaction data 220A may originate from one or more service providers (e.g., as the transaction is conducted using the services of the marketplace platform and the payment service, the marketplace platform and/or the payment service may gather such data), merchants, and buyers (e.g., as parties to the transaction, the merchant and buyer may each be able to provide data directed to the transaction). The recommendation provider may receive the data as payment transaction data 220B.

Figure 3:
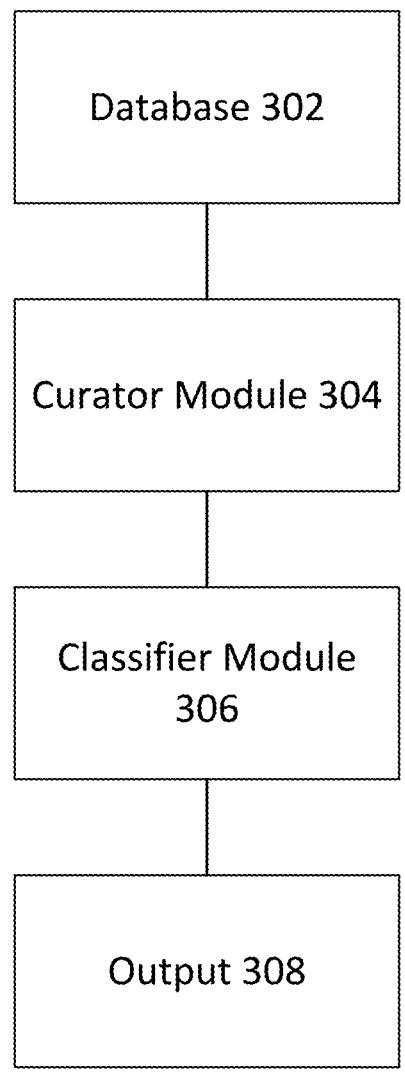
FIG. 3 is a block diagram showing a system for curating and classifying payment transactions according to an embodiment of the disclosure.

Payment transaction data 220B may be provided to a curator module 240 (similar to curator module 304 described in FIG. 3). Curator module 240 may sort the various payments contained within payment transaction data 220B into at least a purchase transaction group 230A-N and a partner fee transaction group 232A-N. Purchase payment transactions may be the portion of a transaction provided to the seller as payment for goods or services. Partner fee transactions may be the portion of a transaction provided to the marketplace platform as compensation for use of the marketplace platform.

Curator module 240 may treat each purchase transaction and partner fee transaction as a single separate transaction. However, any purchase transaction between a merchant and a buyer includes both purchase and partner fee components. In order to accurately analyze existing partner fee arrangements (e.g., in order to determine the percentages charged), each partner fee transaction should be linked to the corresponding purchase transaction. Such linking allows for determination of the full transaction amount (e.g., by adding the purchase transaction and partner fee transaction amounts together) or a percentage value of the partner fee (e.g., by dividing the partner fee by the full transaction amount).

Thus, once the payments are sorted as either a part of purchase transaction group 230A-N or a part of partner fee transaction group 232A-N, each partner fee transaction may be associated with a corresponding purchase transaction by classifier module 242 (similar to classifier module 306 described in FIG. 3). Such association may link a purchase transaction 230A to a partner fee transaction 232A. Techniques for such linking are further described in, for example, FIG. 3 (e.g., the section directed to classifier module 306).

Once the purchase transactions and partner fee transactions are linked, a partner fee recommendation 236 may be calculated. Various embodiments may utilize additional data to calculate partner fee recommendation 236. Thus, for example, onboarding data 222, sales data 224, conducted transaction data 226, and offerings data 228 may originate from one or more of the service provider, merchant, and buyer and communicated to the recommendation provider and used to determine the partner fee recommendation. In certain embodiments, such data may be communicated as individual transactions are conducted or communicated as a batch. Such data may be aggregated from a plurality of payment transactions conducted with a payment provider, data received from one or more partners or other marketplace providers not using the payment services of the payment provider, data from social media, data from merchants and/or customers, or other such data. The data may be stored within one or more database until needed for calculation of a partner fee recommendation.

In certain embodiments, onboarding data 222 may originate during the onboarding process of merchants signing up with marketplace platforms (e.g., as part of a survey) and may include, for example, business characteristics (e.g., name, address, email, phone, tax identification numbers, and/or other such identifying information), category types of the items or services of the transactions (e.g., categories such as: garment, electronic, food, service industry, and others), geographical locations of the merchant, marketplace partner, and/or the buyer as well as the transaction currency and shipping options, revenue model of the merchant and/or marketplace partner (e.g., flat rate, commission based, monthly subscription, per category, per item, and/or other models), social media information (e.g., Facebook®, Instagram®, YouTube®, Twitch®, or social media accounts of the buyer, seller, or other party), ratings of the merchant or buyer (e.g., review blog ratings, Yelp® ratings, and other such ratings). Based on onboarding data 222, the partner fee recommendation may be further tailored by, for example, determining that a buyer is typically interested in a certain shipping option, realizing that the volume of the buyer's sales would allow for efficiencies of scale in the shipping option, and thus tailoring the partner fee recommendation to allow for a lower percentage to be charged when the shipping option is selected.

Sales data 224 may include costs incurred by a marketplace platform or a merchant during sales of a product or service. Sales data 224 may include data relative to advertisement cost, fulfillment cost, payment processing cost, storage cost, packaging cost, and other such costs. In certain embodiments, sales data 224 may be directly received from one or more sources (e.g., the marketplace platform, merchant, or buyer). In other embodiments, sales data 224 may be inferred from other data. For example, advertisement cost may be inferred from social media presence, revenue model, and sales volume. Costs of sales data 224 may allow for a customized partner fee recommendation by, for example, recommending a larger flat fee for merchants with bulkier items and, thus, larger storage costs.

Conducted transaction data 226 may include data gathered when transactions are conducted (e.g., when transactions are conducted on the marketplace platform). Conducted transaction 226 data may include a selling cost, a time on the market (e.g., from when an item or an amount of inventory is first listed to when it is sold), seasonal, periodic, or other market trends, sales volumes, refund rate, geographical locations of customers, currency used in transactions, revenue models of the seller, sales trend (e.g., with relation to time), seller or item reviews, defect rate, or other such data. The partner fee recommendation may utilize such data by, for example, determining that the merchant sells an item prone to defects. As return processing may be costly and labor intensive, the partner fee recommendation may reflect the expected high return rate by charging a lower percentage per conducted transaction, but refunding a smaller portion of a purchase price for items returned to the merchant. Additionally, if the merchant typically conducts seasonal business, the partner fee recommendation may include different rates for different season to aid the merchant with cashflow.

Offerings data 228 may include data directed to products offered by the merchant. Such data may reflect the individual SKUs, product categories, size, technology field, expected customer base, and other data directed to the items or services offered by the merchant. The partner fee recommendation may be tailored based on offerings data 228 by, for example, offering a lower fee for merchants that have a relatively low number of SKUs (thus simplifying item management) but high volume of sales of those SKUs. Conversely, the partner fee recommendation for a merchant with a high number of different SKUs may be higher.

The various data may be provided to the recommendation provider from the various sources. Such data may be data aggregated from a plurality of payment transactions involving the source as a participant in the transaction. Thus, for example, such data may be data received via payment transactions conducted with a payment provider, data received from one or more partners or other marketplace providers not using the payment services of the payment provider, data from social media, data from merchants and/or customers, or other such data. In certain embodiments, data from one or a plurality of transactions may be provided from one or more service providers.

Additionally or alternatively, data may be directly received from merchants or buyers. Such data may be, for example, data from individual transactions conducted by the merchant or buyer. The data may be communicated to the recommendation provider (e.g., for storage or analysis) during each instance when a transaction is conducted. Thus, for example, when a transaction is conducted, the merchant and/or the buyer may provide data detailing the transaction directly to the recommendation provider (e.g., in such an example, client device 104, which may be a device of the merchant's or the buyer's, may communicate such data to server device 102 through network 160 after transaction that is concluded).

In certain other embodiments, the recommendation provider may be the payment service provider. Thus, when a transaction is conducted, the payment service provider may provide payment to the merchant on behalf of the buyer. Such payment may include the details of the transaction. Once the payment service provider receives such data, the payment service provider may add the details to a database for use in providing a partner fee recommendation in real time or in the future.

A system including curator module 240 and classification module 242 may be further detailed in FIG. 3. FIG. 3 is a block diagram showing a system for curating and classifying payment transactions according to an embodiment of the disclosure. FIG. 3 illustrates a system that includes a database 302, a curator module 304, a classifier module 306, and an output 308. Curator module 304 and classifier module 306 may be components of fee curator 210. Curator module 304 may correspond to curator module 240 and classifier module 306 may correspond to classifier module 242.

The block diagram of FIG. 3 may be a DNN ML network configured to perform partner fee data curation and classification. Such a DNN ML network may, for example, extract financial data from a database to identify different categories of financial transactions (e.g., transaction fees and partner fees) and classify the data as such. Such data may be data stored within database 302 and may originate from a plurality of platforms, merchants (received directly or indirectly from other sources such as platforms), and/or buyers. In certain embodiments, the data may be received through transactions conducted by, for example, a payment service provider. As the payment service provider provides payments for a variety of transactions conducted through a variety of platforms, merchants, and sellers, the payment service provider may be in a unique position of being able to obtain data from many different points of transactions and many different parties, including competitors.

Database 302 may be similar to other databases described herein. Database 302 may store data such as payment transaction data and provide such data to curator module 304. Curator module 304 may classify portions of the payment transaction data into, for example, purchase transactions or partner fee transactions.

In certain embodiments, curator module 304 may be a DNN ML model trained to determine whether a payment transaction, or a portion thereof, is a purchase transaction or a partner fee transaction. Curator module 304 may perform such a determination based on, for example, parameters associated with the payment transaction. For example, payment transaction data may include one or more parameters directed to the transaction. Such parameters may include a transaction ID, a buyer identity, a seller identity, a marketplace platform identity, a marketplace platform fee, a platform fee payer identity, a transaction amount, a service provider fee, a service provider fee payer identity, and payment context.

Once curator module 304 has determined that various payment transactions are purchase transaction or partner fee transactions, curator module 304 may then communicate the sorted data to classifier module 306. Classifier module 306 may then link each purchase transaction with the associated partner fee transaction to create partner fee data. Such linking may be accomplished through, for example, a nearest neighbor algorithm such as a K-Nearest-Neighbor (KNN) algorithm. The linked partner fee data may then be outputted.

Figure 4:
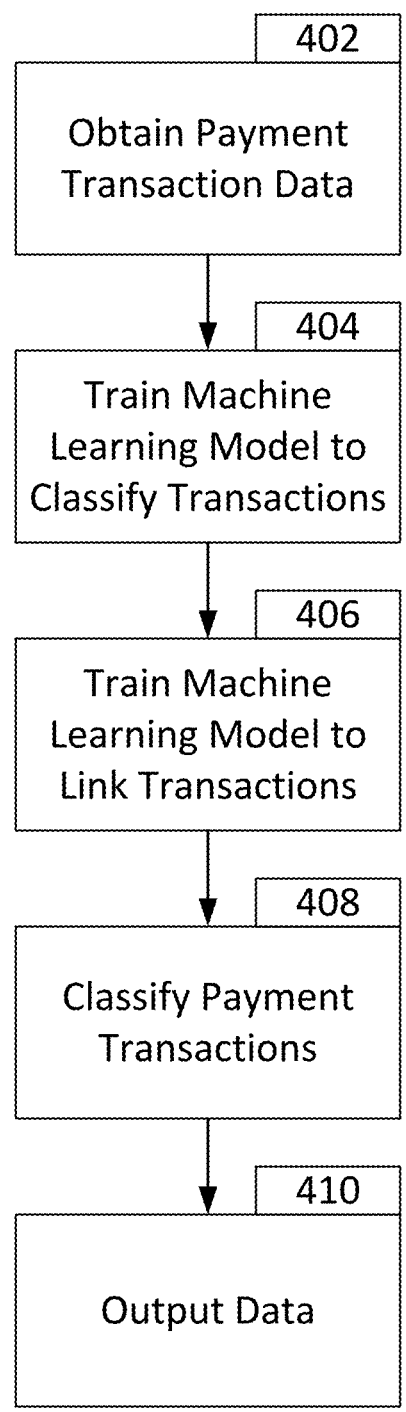
FIG. 4 is a flowchart illustrating a technique of training a DNN ML model to classify and link various payment transactions.
Figure 5:
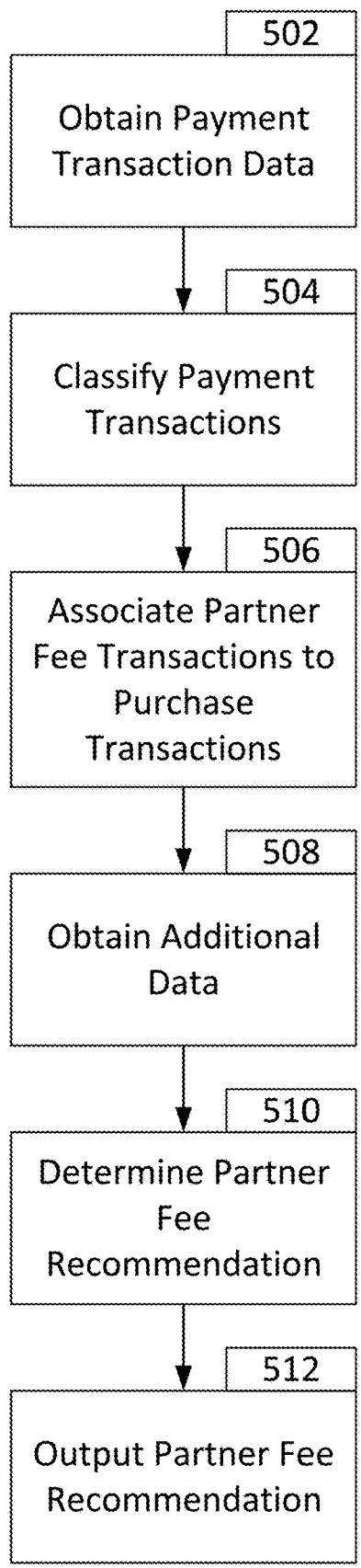
FIG. 5 is a flowchart illustrating a technique of determining a partner fee recommendation.

The systems and outputs of FIGS. 1-3 may be used to determine a partner fee recommendation. FIGS. 4 and 5 are flowcharts showing examples of operations of determining partner fee recommendations according to embodiments of the disclosure. FIG. 4 is a flowchart illustrating a technique of training a DNN ML model to classify and link various payment transactions.

In block 402 payment transaction data may be obtained as described herein (e.g., by server device 102 through communications circuitry 202 from client device 104). After the payment transaction data has been obtained in block 402, a ML model may be trained to categorize payment transactions, or a portion thereof in block 404. Such payment transactions may be categorized as, for example, a purchase transaction, a platform partner fee transaction, a payment provider fee transaction, or another such transaction by curator module 240 and/or 304. For example, each transaction within a first portion (e.g., 1%) of existing payment transactions may be manually categorized as a purchase transaction, a marketplace platform partner fee transaction, a payment provider fee transaction, or another such transaction.

After the first portion of payment transactions have been categorized, a collection of root words may be created. Each root word may be associated with one or more classes of transaction (e.g., may be associated with the purchase transaction, the platform partner fee transaction, the payment provider fee transaction, or another transaction). The root words may be, for example, words that may occur in data associated with a transaction. Thus, for example, payment transaction data that includes root words associated with an identity of a marketplace platform provider (e.g., root words such as "eBay®") may be determined to be root words indicating that a transaction is a platform partner fee transaction. By contrast, payment transaction data that includes root words of clothing purchase items (e.g., "clothing," "groceries," "orange juice," "batteries," and related brands) may be determined to be root words indicating that a transaction is a purchase transaction. Likewise, words directed to an identity of a payment service provider (e.g., "PayPal®") may be determined to indicate a payment provider fee transaction.

In certain embodiments, a single transaction may include multiple transaction components. Determination of each transaction component may include identifying root words. Thus, the classification of each component may be identified from the root words. An example of root words and other information in payment transaction data is detailed in FIG. 8. Additionally, the classification of components may also be determined through an amount or percentage of the transaction component being classified. For example, as platform partner fees are generally a minor percentage of a transaction, components of a transaction that are minor percentage of the total transaction may be determined to more likely be the platform partner fees. Such a transaction component may be differentiated from sales tax or other percentage based fees by determining a location of the buyer or seller and determining and matching the taxes due for the transaction. Furthermore, a payment service provider analyzing such transactions may understand the amount that it charges for payment providing service. As such, the payment service provider may determine the payment provider fee for the transactions from its own records.

The payment transactions may also include transaction attributes. The attributes may include attributes identifying the party providing or receiving the payment (e.g., buyer, receiver, or seller) as well as a country of transaction, a currency of the transaction, and an amount. The payment transactions may also be tagged with appropriate transaction attributes.

Based on the root words, the amount or percentage of the transaction component, and the transaction attributes, the ML network may be trained to determine a category (e.g., a purchase transaction, a marketplace platform partner fee transaction, a payment provider fee transaction) for a given payment transaction or a portion thereof. For example, while the marketplace platform partner fee may typically be small, the ML network may be trained to determine that a first country may typically result in larger platform fees or percentages. Thus, the ML network may be trained to determine that, though a fee may be too large to likely be a platform fee in a second country, such a fee may be a platform fee in the first country. In another example, the ML network may determine that payment transactions and partner fee transactions typically are performed very close to one another in time. Thus, if a first transaction is determined to be a payment transaction, another transaction performed at or near the same time as the first transaction may be determined to be a related partner fee transaction.

Based on the training, a second portion of the payment transactions (e.g., the remaining portion) may be tagged with transaction attribute data. The second portion may then be classified based on the tagged transaction attribute data, any root words within the payment transaction data, and/or additional such data. Thus, such payment transaction data may be classified as a purchase transaction, a marketplace platform partner fee transaction, a payment provider fee transaction, or another such transaction.

As such, the ML network may be trained to initially evaluate many different attributes within the payment transaction data. Each such attribute may indicate the category of the payment transaction data (e.g., whether it is a purchase transaction or partner fee transaction). The ML network may advance through a plurality of stages of such analysis. In certain embodiments, the stages may each evaluate different attributes, but other embodiments may evaluate one or more of the same attributes, but with different weights.

Thus, in a first example, the ML network may first evaluate a first set of transaction attributes (e.g., keywords within the description) to determine the category of payment transaction. If evaluation of the first set is uncertain (e.g., if confidence cannot be determined with 99% certainty), the ML network may proceed to evaluate a second set of transaction attributes (e.g., an amount of transaction) to further aid in determining the category. In a second example, if the ML network during a first pass may not determine the category with an adequate amount of certainty, the ML network may adjust the weights on a second pass (e.g., by weighting keywords more). Once the category is determined, the payment transaction may be tagged with the appropriate transaction attribute data.

In block 406, a ML network (e.g., classifier module 242 or 306) may be trained to associate transactions with related transactions. Thus, for example, a purchase transaction, a marketplace platform partner fee transaction, and a payment provider fee transaction may typically be component parts of a single transaction, but may be stored as separate transactions within a database. In order to determine an appropriate partner fee, the percentage of a typical transaction that the partner fee forms may need to be determined. In order to make such a determination when the transactions are separated, the transactions need to be linked.

Thus, based on the classified payment transaction data of block 404, block 406 may link the classified payment transactions to associated transaction. Thus, for example, each purchase transaction may be linked to a marketplace platform partner fee transaction and/or a payment provide fee transaction. Such linking may be accomplished through, for example, a KNN algorithm to link the various transactions. Furthermore, the timing of the transactions may be determined and transactions that are near in time may be linked (indicating that they were component parts of a larger transaction).

In certain embodiments, a ML network may be trained to link payment transactions. Such training may be accomplished by having one of the data sets (e.g., a data set of the marketplace platform partner fee transactions) as a training set and another of the data sets (e.g., a data set of the purchase transactions) as test data. Based on the training set and the test data set, the KNN algorithm may be performed to link purchase transactions with their nearest neighbor partner fees. Such linked data may then be used as an input data set to determine a recommended partner fee or to train a ML based partner fee recommendation.

After training the ML networks in blocks 404 and 406, the ML network may then be used to classify and link payment transactions in block 408. Such classified and linked data may be output in block 410. The outputted data may be utilized to determine a partner fee recommendation.

FIG. 5 is a flowchart illustrating a technique of determining a partner fee recommendation. In block 502, payment transaction data may be obtained as described herein. Such payment transactions may be classified and associated, by the ML network, with corresponding transactions (e.g., a purchase transaction may be associated with a corresponding partner fee transaction) in blocks 504 and 506. The techniques used in blocks 504 and 506 may be similar to that described in, for example, blocks 404 and 406.

In block 508, data additional to the payment transaction data may be obtained. Such data may include, for example, onboarding data, conducted transaction data, sales data, or other such data. Onboarding data may include, for example, business characteristics (e.g., name, address, email, phone, tax identifications number, and other information), item category types (e.g., whether the item is a garment, an electronic device, food, a service, or another category), geographical locations (e.g., seller location, buyer location, transaction currency, shipping route), the revenue model or structure of the marketplace platform (e.g., flat rate, commission based, monthly subscription, per category of items sold, per item sold, or other such categories), involvement with social media (e.g., the presence of the marketplace platform and/or the seller on one or more social media platforms), online ratings, and other such data gathered during the onboarding process (e.g., when the marketplace platform onboards the seller).

As such, the various techniques described herein may receive and classify payment transaction data, which may be data received by a payment provider, and other additional data, which may be data originating from other sources such as merchants, marketplace platform providers, buyers, and other sources. Such data may then be used to determine a partner fee recommendation in block 510. In certain examples, the partner fee recommendation may be determined using a deep neural network.

The deep neural network may be trained to determine a partner fee recommendation based on the payment transaction data and the other data received. The partner fee recommendation may be a recommendation for a continuous relationship, for one transaction, for a set period of time, for an item or a category of items, or other such relationship. The partner fee recommendation may be for a flat fee, a commission based structure, or both.

Typically, a seller or merchant gravitates towards marketplace platforms that charge low rates, whether fixed or percentage based, in order to maximize profits. However, each marketplace platform offers advantages and disadvantages that are not shared with others. For example, certain marketplace platforms may offer an opportunity for higher sales volumes of certain products. Another marketplace platform may have a small market in a first country, but a large market in a second country. A third marketplace platform may provide a fulfillment and distribution service with many warehouses located throughout a country.

In order to be competitive, marketplace platforms should have a competitive platform fee structure, whether flat fee, percentage based, or both. However, a number of factors spread across multiple parties are useful in determining fee structures. When such data is available, a customized fee structure may be determined that may provide an advantage in capturing the business of buyers and/or merchants. However, typical marketplace platforms do not have the required data to provide such a customized fee structure (as well as any incentives) to their customers.

However, in certain situations, payment provider services may be able to extract such data from multiple parties and multiple layers of the transaction as the services and APIs of the payment provider services are integrated across multiple marketplace platforms. For example, when a seller, merchant, or a service provider onboards onto a marketplace platform, they agree on a commission structure with the marketplace platform. The marketplace platform may then communicate the commission structure (e.g., from client device 102 to server device 104 via network 160) to the payment provider service so that the payment provider service may charge the commission on behalf of the marketplace provider. Thus, when a transaction occurs between a buyer and a seller, the payment provider service would honor the commission structure and extract the commission based on the agreement and provide it to the marketplace platform.

Based on such data and other received data, the payment provider service may utilize a DNN based model (e.g., partner fee recommender 212) to determine a partner fee attractive to both the marketplace platform and their potential customers. Such partner fees may include one or more of flat fees, commission-based fees, subscription fees, advertisement-based fees, fulfillment-based fees, payment processing fees and/or a combination of such. Such partner fees may be determined from payment transaction data determined by the payment provider and/or other data such as onboarding data, conducted transaction data, sales data, or other such data.

The DNN based model may be trained to determine the partner fee based on such data. For example, the DNN based model may determine, from classified and associated payment transaction data, the fee structures of a plurality of different marketplace platforms. The DNN may then determine a partner fee competitive with the different marketplace platforms (e.g., a fee that may attract customers compared to competitor marketplace platforms based on, for example, a lower flat fee or percentage fee).

In certain situations, other factors besides the cost of the fee structures may be considered by potential customers such as merchants or buyers. The DNN may be trained to simulate consideration of such factors. Thus, for example, from onboarding data, the DNN may determine that a merchant primarily sells one category of products (e.g., cosmetics). The DNN may determine from sales data that the marketplace platform it is providing the partner fee recommendation to generally has higher sales volume for such a category of products than its competitors and may, thus, adjust the recommended partner fee amount or percentage upward. Alternatively, the DNN may determine that sales volume growth in such a category is a business goal of the marketplace platform and may, thus, adjust the recommended partner fee downward in order to conform with the business goal and capture additional merchants of such products to create sales growth within the category.

In another example, a merchant may be interested in growing sales in a second country. As the marketplace platform may have a large sales presence in the second country, the recommended partner fee may be adjusted upward. In a further example, a merchant may sell time sensitive foodstuffs. The marketplace platform may not currently have a timely fulfillment and distribution service. Thus, the partner fee recommendation may recommend that the marketplace platform reject the merchant outright. If the marketplace platform offered competitive fulfillment and distribution services, the recommended partner fee may be adjusted upward.

In certain additional examples, the DNN may recommend incentives based on goals (continuous, short term, or long term) of the marketplace provider or merchant. Thus, for example, if the DNN determines that a short term goal of the marketplace provider is to aggressively grow their merchant numbers in the next month (e.g., by 10%), the DNN may recommend that the partner fee include a short term discount to attract merchants. Alternatively, if the DNN recognizes that the merchant is currently short on cash, but has plans to aggressively grow sales volume within the next year, the DNN may recommend a low introductory percentage fee based partner fee that changes to a flat fee and a higher percentage fee based partner fee within a year. Such a recommendation may allow the merchant to meets its expansion goals while generating greater long term revenue for the marketplace platform due to the size of the merchant after a year.

Furthermore, the DNN may provide partner fee recommendations to a merchant or seller. For example, based on the received data, the DNN may provide recommendations for reasonable, good, and excellent partner fee targets for negotiation with each marketplace platform. Such partner fees may be accordingly determined based on the techniques described herein.

As such, a DNN may determine a partner fee recommendation in block 510. The partner fee recommendation may be outputted in block 512.

Figure 6:
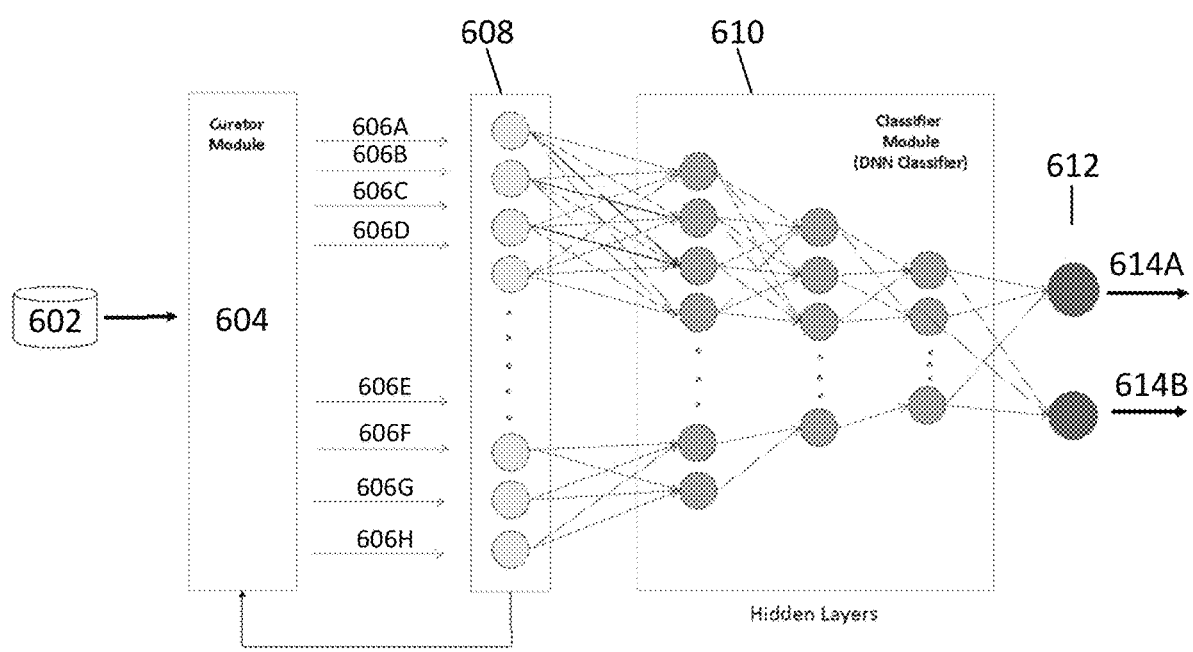
FIG. 6 is a schematic diagram of a neural network according to an embodiment of the disclosure.

FIG. 6 is a schematic diagram of a neural network according to an embodiment of the disclosure. FIG. 6 illustrates a neural network that may perform the techniques described in FIGS. 4 and 5, or portions thereof. The system of FIG. 6 may include database 602 (similar to databases 145, 208, or 302), curator module 604 (similar to curator module 304), input layer 608, classifier module 610 (similar to classifier module 306), and output layer 612. Database 602 may be a database as described herein. Database 602 may provide data to curator module 604. Classifier module 610 may be, for example, a hidden layer. Each of input layer 608, classifier module 610, and output layer 612 may include one or more nodes. As shown in classifier module 610, modules and layers may include one or more layers that each include its own set of nodes.

Each node in a layer may be connected to every node in an adjacent layer. Though classifier module 610 is shown to have three layers, other embodiments may include any numbers of layers.

Curator module 604 may determine transaction attribute data 606 from such data. Determined transaction attribute data 606 may be used as an input layer 608. Each attribute may be a distinct input. Thus, for example, attribute data 606A may correspond to a transaction ID, attribute data 606B may correspond to a buyer, attribute data 606C may correspond to a seller, attribute data 606D may correspond to a marketplace platform, attribute data 606E may correspond to a transaction amount, attribute data 606F may correspond to a payment service provider fee, attribute data 606G may correspond to a payment service provider fee payee, and attribute data 606H may correspond to a payment context.

Such attribute data may serve as inputs for classifier module 610. In some embodiments, each of the nodes within classifier module 610 may generate a representation, which may include a determination or algorithm that produces a value or data based on the input values received from attribute data 606A-H. Such algorithms may include mathematical computation models that may assign different weights to each of the data values received from attribute data 606A-H. Each of the nodes may include different algorithms and/or different weights assigned to the data variables from attribute data 606A-H such that each of the nodes within a layer may produce a different value based on the same attribute data received. In some embodiments, the weights that are initially assigned to attribute data 606A-H for each of the nodes may be randomly generated (e.g., using a computer randomizer). A plurality of connected layers may each generate values with different algorithms and weights until output values are generated for output layer 612. Output layer 612 may output data that classifies payment transaction data from database 602 into groups of either purchase transaction 614A or partner fee transaction 614B The network shown in FIG. 6 may be trained by using training data. By providing training data to the network, the various nodes of the network (e.g., nodes within classifier module 610) may be trained (adjusted) such that an optimal output (e.g., a classification) is produced in output layer 612 based on the training data. By continuously providing different sets of training data, and penalizing the neural network when the output of the artificial neural network is incorrect (e.g., when a payment transaction is incorrectly classified as either a purchase transaction or a partner fee transaction), the network and, specifically, the nodes within classifier module 610, may be trained or adjusted to improve its performance in data classification. Adjusting the network may include adjusting the weights associated with each node classifier module 610.

Figure 7:
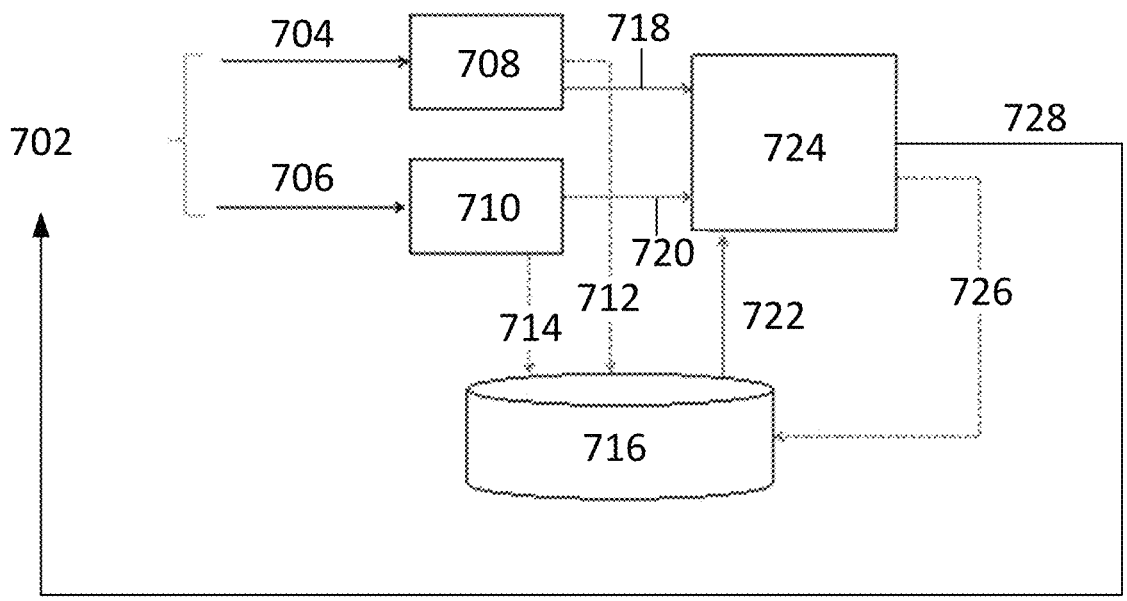
FIG. 7 is a schematic diagram of another system for determining a partner fee recommendation according to an embodiment of the disclosure.

FIG. 7 is a schematic diagram of another system for determining a partner fee recommendation according to an embodiment of the disclosure. FIG. 7 illustrates a system that includes marketplace partner 702 (e.g., the service provider, merchant, or buyer in FIG. 2B), payment transaction data 704 (e.g., payment transaction data 220A of FIG. 2B), other data 706 (e.g., data 222-228 of FIG. 2B), payment transaction data processor 708 (e.g., fee curator 210 or one or both of curator module 304 or classifier module 306), other data processor 710, database 716 (e.g., database 145, 208, or 302), and DNN 724 (e.g., partner fee recommender 212).

Marketplace partner 702 may provide data. In certain embodiments, other sources in addition to marketplace partner 702 may also provide data. Such data may include payment transaction data 704 as described herein and other data 706 (e.g., onboarding data, conducted transaction data, and sales data). Payment transaction data processor 708 and other data processor 710 may process payment transaction data 704 and other data 706. In certain embodiments, payment transaction data processor 708 may, for example, determine one or more root words within payment transaction data 704 or attributes of each payment transaction within data 704. Payment transaction data processor 708 may also curate and classify each payment transaction into a purchase transaction or a partner fee transaction. Other data processor 710 may also determine and classify relevant attributes contained within other data 706 (e.g., business goals, sales volumes, and such related data).

Data 712 and 714 determined by payment transaction data processor 708 and other data processor 710 may be output to database 716. Database 716 may store such data and may look up and provide data 722 to DNN 724 as needed. DNN 724 may receive data 722 from database 716, but may also receive data 718 and 720 directly from payment transaction data 708 and other data processor 710 (e.g., when a marketplace partner requests a partner fee recommendation for provides the data set to determine the partner fee recommendation).

DNN 724 may, from the received data, determine one or more recommended partner fees 728 as described herein. Recommended partner fees 728 may be provided to marketplace partner 702 (or another marketplace partner, merchant, or buyer). Furthermore, the determined recommended partner fees may be provided as data 726 to database 716. Such data may be used to improve the future performance of DNN 724.

Figure 8:
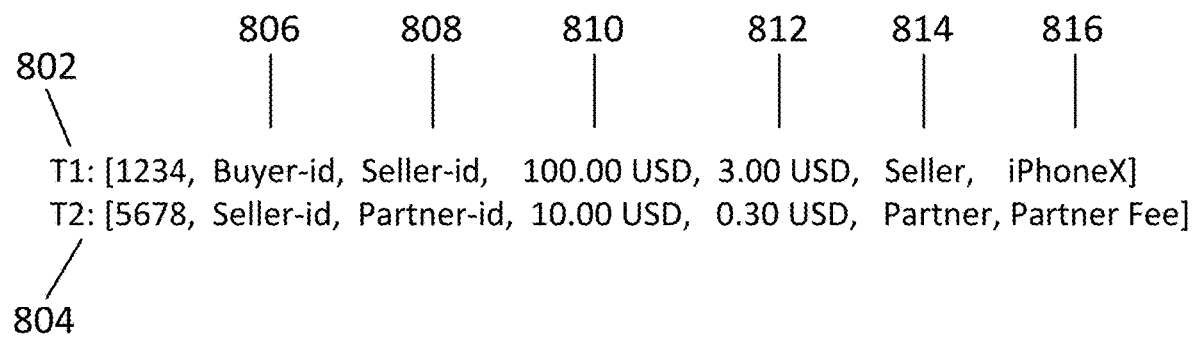
FIG. 8 is an example of payment transaction data according to an embodiment of the disclosure.

Payment transaction data as described herein may include many facets of data. FIG. 8 is an example of payment transaction data according to an embodiment of the disclosure. FIG. 8 illustrates a transaction for one item or service between a buyer and a seller conducted on a marketplace platform. Payment for the transactions in FIG. 8 is provided through a payment service provider. The payment transaction data detailed in FIG. 8 may be curated, classified, linked, and utilized to help provide a partner fee recommendation.

The transaction for one items results in two separate payment transactions; transaction 802 and transaction 804. The structure of the transaction detailed in FIG. 8 includes the buyer paying the seller directly (in transaction 802) and the seller paying the marketplace provider (in transaction 804) from the funds that the seller received from the buyer. In various embodiments, transactions 802 and 804 may be communicated as one payment transaction and then parsed into two separate component transactions by transaction analyzer 206 or communicated as two separate transactions.

The data directed to the payment transactions may include components 806-816. Component 806 identifies the payer of the transaction and component 808 identifies the recipient of the transaction. In transaction 802, the payer is the buyer and the recipient is the seller while in transaction 804, the payer is the seller and the recipient is the marketplace provider.

Component 810 identifies the dollar amount of the transaction and component 812 identifies the amount due to the payment service provider. Component 814 identifies the party responsible for paying the amount due to the payment service provider. Component 816 identifies details of the transaction. In certain embodiments, the details of the transaction may be used to identify the transaction as either a purchase transaction or a partner fee transaction. Thus, for example, curator module 240 or 304 may analyze component 816 for various root words. "iPhoneX" or another product name may be used as a root word by curator module 240 or 304 as likely indicating that the transaction is a purchase transaction. Thus, transaction 802 may be accordingly determined to be a purchase transaction. By contrast, "Partner Fee" or names of a marketplace platform may be used as a root word by curator module 240 or 304 as likely indicating that the transaction is a partner fee transaction. Thus, transaction 804 may be accordingly determined to be a partner fee transaction.

Curator module 240 or 304 may also analyze other aspects of the payment transaction data to determine whether the transaction is a purchase transaction or partner fee transaction. For example, the identity of the payer and/or recipient may be analyzed. If the recipient includes the seller, as in transaction 802, then the transaction may likely be the purchase transaction. If the recipient includes the marketplace platform, then the transaction may likely be the partner fee transaction.

In certain embodiments, after the purchase transaction is linked to the corresponding partner fee transaction, the partner fee recommender 212 or classifier module 306 may further analyze the linked transaction to determine a true value of the purchase transaction or the partner fee transaction. Thus, for example, it may be determined that as transactions 802 and 804 are linked, the total value of payment was $100 where $10 of that payment was provided to the marketplace provider as a partner fee. A total of $3.30 was paid to the payment service provider ($3.00 by the seller and $0.30 by the marketplace provide). Thus, the purchase transaction value was $90, the partner fee was $10, and the payment service fee was $3.30 total.

The partner fee recommender 212 or classifier module 306 may be configured to analyze transactions reported in a plurality of different ways. For example, $100 may be provided by the buyer to the marketplace platform. The marketplace platform may then provide $90 to the seller and keep the remaining $10 as a partner fee. Thus, in such an example, the first transaction is valued at $100 and the second transaction is valued at $90. However, as the transactions are linked, the partner fee recommender 212 or classifier module 306 may determine that the second transaction is payment to the seller and the first transaction is merely the buyer paying the marketplace provider as a middleman. Thus, it may be determined that the purchase transaction value was $90 and the partner fee was $10 ($100 minus $90). Other techniques of determining the values of the purchase transaction and/or the partner fee transaction may also be utilized.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order, hierarchy of steps, or device configuration in the techniques disclosed is an illustration of exemplary approaches. Based upon design preferences, it is understood that the specific order, hierarchy of steps, and/or device configuration in the techniques may be rearranged. Reference to "first," "second," or other numerical identifiers within the disclosure is for identification purposes only unless an explicit hierarchy is referenced.

What is claimed is:

1. A system comprising:
   a non-transitory memory; and
   one or more hardware processors coupled to the non-transitory memory and configured to read instructions from the non-transitory memory to cause the system to perform operations comprising:
   obtaining payment transaction data associated with a first plurality of payment transactions, wherein the first plurality of payment transactions are associated with a plurality of merchants and a plurality of marketplace providers associated with one or more marketplace platforms through which the plurality of merchants sell goods and/or services;
   extracting, from the payment transaction data and for each payment transaction from the first plurality of payment transactions, words that describe the payment transaction, an amount associated with the payment transaction, and attributes associated with the payment transaction;
   classifying, using a first neural network trained using root words extracted from a second plurality of payment transactions, each payment transaction from the first plurality of payment transactions as either a purchase transaction or a partner fee transaction based on the words that describe the payment transaction, the amount associated with the payment transaction and the attributes associated with the payment transaction;
   associating each payment transaction classified as a partner fee transaction with one of the first plurality of payment transactions to create partner fee data;
   obtaining onboarding data, offerings data, and sales data associated with the plurality of marketplace providers;
   obtaining data about a first marketplace provider;
   determining, using a second neural network, a partner fee recommendation for the first marketplace provider based on the data about the first marketplace provider and at least one of the partner fee data, the onboarding data, the offerings data, or the sales data; and
   providing the partner fee recommendation to the first marketplace provider.

2. The system of claim 1, wherein the operations further comprise:
   linking each payment transaction classified as a partner fee transaction with the associated purchase transaction.

3. The system of claim 1, wherein the operations further comprise:
   determining, based on the sales data, a marketplace cost associated with completion of sales for the first plurality of payment transactions, wherein the determining the partner fee recommendation is further based on the marketplace cost.

4. The system of claim 1, wherein the operations further comprise:
   receiving first merchant data associated with a first merchant unassociated with the first marketplace provider, wherein the first merchant data comprises data representing selling costs of the first merchant, and wherein the partner fee recommendation is determined based further on the first merchant data and comprises a fee recommendation for the first marketplace provider to provide services to the first merchant.

5. The system of claim 1, wherein the first neural network is operated through a first Application Programming Interface (API) based program associated, and wherein the second neural network is operated through a second API based program.

6. The system of claim 1, wherein the onboarding data comprises a revenue model, and wherein the determining the partner fee recommendation comprises determining a partner fee level that is forecasted to attract a number of merchants to the first marketplace provider to conform with the revenue model.

7. The system of claim 1, wherein the payment transaction data originates from the plurality of marketplace providers.

8. A method, comprising:
   obtaining, by one or more hardware processors, payment transaction data associated with a first plurality of payment transactions, wherein the first plurality of payment transactions are associated with a plurality of merchants and a plurality of marketplace providers;
   extracting, by the one or more hardware processors from the payment transaction data and for each payment transaction from the first plurality of payment transactions, words that describe the payment transaction, an amount associated with the payment transaction, and attributes associated with the payment transaction;
   classifying, by the one or more hardware processors using a first neural network trained using root words extracted from a second plurality of payment transactions, each payment transaction from the first plurality of payment transactions as either a purchase transaction or a partner fee transaction based on the words that describe the payment transaction, the amount associated with the payment transaction and the attributes associated with the payment transaction;

associating, by the one or more hardware processors, each payment transaction classified as a partner fee transaction with one of the plurality of payment transactions;

creating, by the one or more hardware processors, partner fee data based on the associating;

obtaining, by the one or more hardware processors, onboarding data, offerings data, and sales data associated with the plurality of marketplace providers;

obtaining, by the one or more hardware processors, data about a first marketplace provider;

determining, by the one or more hardware processors using a second neural network, a partner fee recommendation for the first marketplace provider based on the data about the first marketplace provider and at least one of the partner fee data, the onboarding data, the offerings data, or the sales data; and providing, by the one or more hardware processors, the partner fee recommendation to the first marketplace provider.

9. The method of claim 8, further comprising:
linking each payment transaction classified as a partner fee transaction with the associated payment transaction from the first plurality of purchase transactions.

10. The method of claim 8, further comprising:
determining, based on the sales data, a marketplace cost associated with completion of sales for the first plurality of payment transactions, wherein the determining the partner fee recommendation is further based on the marketplace cost.

11. The method of claim 8, further comprising:
receiving first merchant data associated with a first merchant unassociated with the first marketplace provider, wherein the first merchant data comprises data representing selling costs of the first merchant, and wherein the partner fee recommendation is determined based further on the first merchant data and comprises a fee recommendation for the first marketplace provider to provide services to the first merchant.

12. The method of claim 8, wherein the first neural network is operated through a first Application Programming Interface (API) based program associated, and wherein the second neural network is operated through a second API based program.

13. The method of claim 8, wherein the onboarding data comprises a revenue model, and wherein the determining the partner fee recommendation comprises determining a partner fee level that is forecasted to attract a number of merchants to the first marketplace provider to conform with the revenue model.

14. The method of claim 8, wherein the payment transaction data originates from the plurality of marketplace providers.

15. A non-transitory machine-readable medium having stored thereon machine-readable instructions executable to cause a machine to perform operations comprising:
obtaining payment transaction data associated with a first plurality of payment transactions, wherein the first plurality of payment transactions are associated with a plurality of merchants and a plurality of marketplace providers;

extracting, from the payment transaction data and for each payment transaction from the first plurality of payment transactions, words that describe the payment transaction, an amount associated with the payment transaction, and attributes associated with the payment transaction;

classifying, using a first neural network trained using root words extracted from a second plurality of payment transactions, each payment transaction from the first plurality of payment transactions as either a purchase transaction or a partner fee transaction based on the words that describe the payment transaction, the amount associated with the payment transaction and the attributes associated with the payment transaction;

associating, each payment transaction of the partner fee transaction with one of the plurality of payment transactions;

creating, based on the associating, partner fee data;

obtaining onboarding data, offerings data, and sales data associated with the plurality of marketplace providers;

obtaining data about a first marketplace provider;

determining, using a second neural network, a partner fee recommendation for the first marketplace provider based on the data about the first marketplace provider and at least one of the partner fee data, the onboarding data, the offerings data, or the sales data; and providing the partner fee recommendation to the first marketplace provider.

16. The non-transitory machine-readable medium of claim 15, wherein the operations further comprise:
linking each payment transaction classified as a partner fee transaction with the associated payment transaction from the first plurality of payment transactions.

17. The non-transitory machine-readable medium of claim 15, wherein the operations further comprise:
determining, based on the sales data, a marketplace cost associated with completion of sales for the first plurality of payment transactions, wherein the determining the partner fee recommendation is further based on the marketplace cost.

18. The non-transitory machine-readable medium of claim 15, wherein the operations further comprise:
receiving first merchant data associated with a first merchant unassociated with the first marketplace provider, wherein the first merchant data comprises data representing selling costs of the first merchant, and wherein the partner fee recommendation is determined based further on the first merchant data and comprises a fee recommendation for the first marketplace provider to provide services to the first merchant.

19. The non-transitory machine-readable medium of claim 15, wherein the first neural network is operated through a first Application Programming Interface (API) based program associated, and wherein the second neural network is operated through a second API based program.

20. The non-transitory machine-readable medium of claim 15, wherein the onboarding data comprises a revenue model, and wherein the determining the partner fee recommendation comprises determining a partner fee level that is forecasted to attract a number of merchants to the first marketplace provider to conform with the revenue model.

* * * * *